Oct. 2, 1945.   K. A. SWANSTROM   2,385,953
SELF LOCKING COUPLING NUT
Filed Feb. 12, 1942
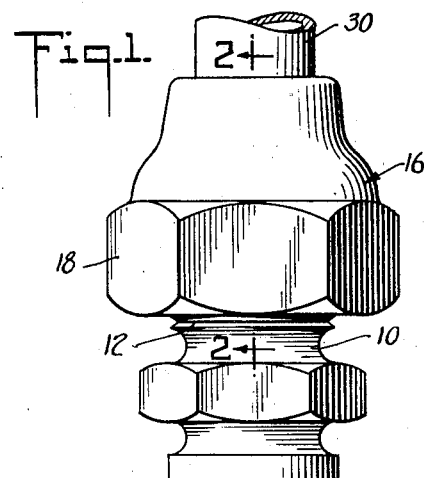
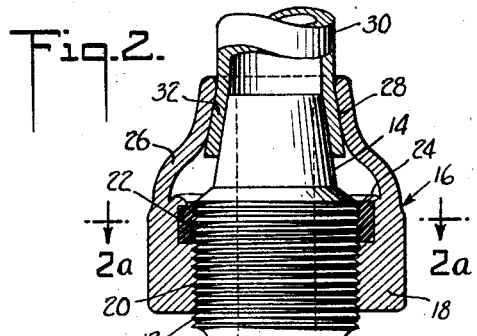
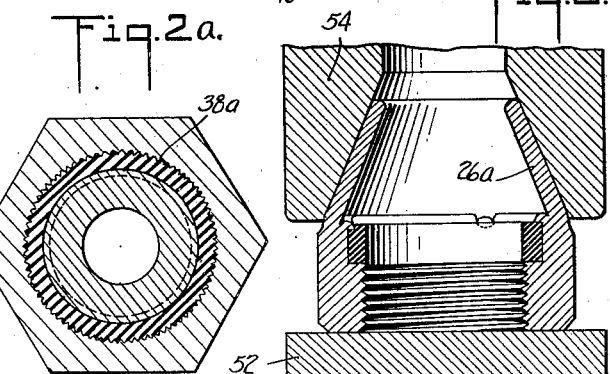
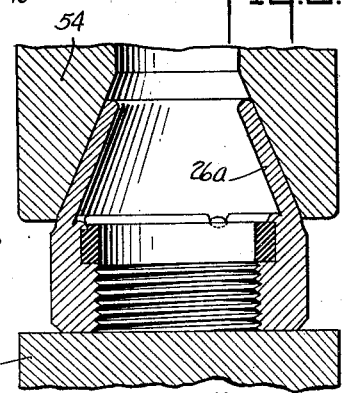
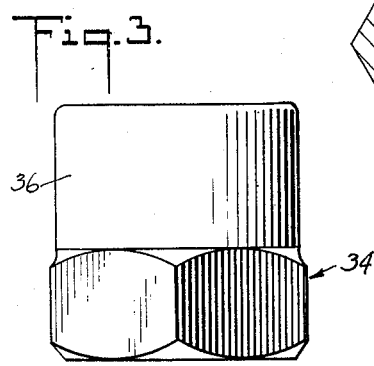
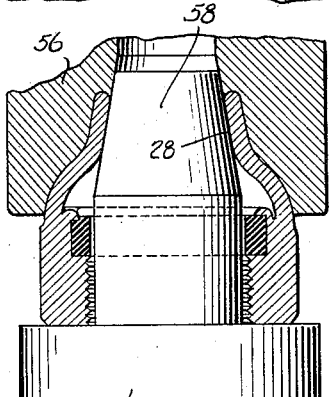
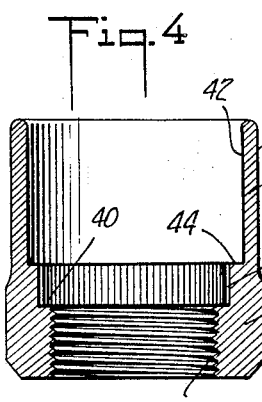
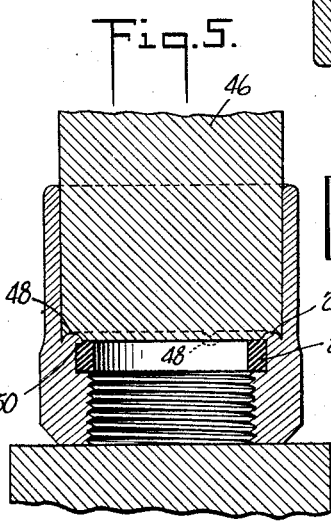
INVENTOR
Klas Arent Swanstrom
BY
James C. Markle
his ATTORNEY Patented Oct. 2, 1945

2,385,953

UNITED STATES PATENT OFFICE 2,385,953

SELF-LOCKING COUPLING NUT

Klas Arent Swanstrom, Union, N. J., assignor to Elastic Stop Nut Corporation, Union, N. J., a corporation of New Jersey Application February 12, 1942, Serial No. 430,549

7 Claims. (Cl. 285—86)

The present invention relates to detachable couplings or unions for pipe or tubing and has particular reference to couplings intended for making connection to the end of a tube of ductile material, such as copper, which is capable of being flared, but is not limited to such application.

Couplings of the kind under consideration have a variety of uses under conditions where the parts are subjected to severe vibration and where in addition the fluid carried by the pipe or tube is of such nature that any leakage at the joint due to loosening of the coupling under vibration must particularly be guarded against. Typical of such uses are gasoline feed lines for internal combustion engines, where any leakage introduces a serious fire hazard, and oil lines for such engines where leakage not only produces a fire hazard but also may cause destruction of the engine for lack of proper lubrication.

A primary object of the present invention is the provision of a new and improved form of coupling nut, the use of which will result in a vibration proof coupling owing to the self-locking characteristics of the nut. A further object is the accomplishment of the above object by means of a nut structure which in no way complicates or adds to the number of parts required for the coupling, as compared with the ordinary or standard couplings now used. A still further object is the provision of a nut of the kind contemplated, by a novel method of manufacture which is not only productive of the improved nuts at low cost, so that they are available for general use, but which also, as a result of the manufacturing method employed, is productive of coupling nuts of superior strength particularly in those parts where strength is essential and failure most likely to occur.

Other and more detailed objects of the invention and the advantages to be derived from its use may most readily be appreciated from a consideration of the ensuing portion of this specification, taken in conjunction with the accompanying drawing, in which:

Fig. 1 is an elevation of a complete coupling embodying the invention;

Fig. 2 is a longitudinal central section of a part of the structure shown in Fig. 1;

Fig. 2a is a section on line 2a—2a of Fig. 2;

Fig. 3 is an elevation of a partially finished nut blank;

Fig. 4 is a section through the blank showing a further stage of manufacture; and Figs. 5 to 7 are sections showing further manufacturing operations for producing the finished nut.

Referring now more particularly to Figs. 1 and 2, the coupling illustrated therein is shown by way of example and only as illustrative of the principles of the invention, but without limitation. In this coupling, which is shown assembled, a tubular coupling part 10 having an external thread 12, which may be the end of a pipe, or a fixture of any kind, is provided with an externally tapered and preferably conical clamping surface 14 at one end. The coupling nut 16, embodying the essentials of the present invention, has a main body portion 18 the external configuration of which may be as desired but which is ordinarily most advantageously of the usual hexagonal section for the reception of a wrench, as shown in Fig. 1. The body portion 18 is provided with a threaded bore 20 the threads of which mate with the threads 12 on member 10. Interiorly of the nut, at one end of the threaded bore 18, the nut body is recessed to receive an annular locking element 22 which is advantageously in the form of one or more washers of elastic material having an unthreaded bore the diameter of which is intermediate that of the maximum and minimum diameters of the thread 12 on member 10. One material suitable for this element is comercially available vulcanized fibre. This locking element is clamped axially in its recess by a flange 24 formed from a part of the nut body as hereinafter explained and is also restrained against rotational movement in the nut body by means also to be explained later.

The nut is provided with a circular skirt or clamping extension 26 projecting axially of the nut beyond the locking element and presenting a tapered internal clamping surface 28 the form and configuration of which is predetermined and which is preferably but not necessarily complementary to the surface 14 on member 10.

The tube 30, which may be of copper, mild steel or any other material sufficiently ductile for the purpose, has a flared end 32 which is received and rigidly clamped between the clamping surface 14 of member 10 and the clamping surface 28 of the nut, to effect the desired union. In order to assemble the parts, the nut is ordinarily slipped over the end of the tube before the latter is flared, the tube end is then flared by any suitable expanding tool, and the parts thereafter threaded together.

It will be remembered that the locking element, if of the type described, is originally unthreaded. When the nut is threaded on to member 10, the engaged threads 12 and 20 force the thread 12 on member 10 through the elastic element 22, forming a thread in the bore of the latter and developing, because of the axial flexure of the locking element, and its elastic nature, a continuously exerted axial force between the nut and the coupling member which keeps one set of flanks of the engaged threads 12 and 20 in constant pressure contact. The elimination of all axial play between the threads is sufficient to keep the nut from turning on member 10 regardless of its contact or lack of contact with any other member.

As the nut is screwed home the clamping surface 14 of member 10 engages the flared tube end 32 to clamp it between surfaces 14 and 28. This also creates an axial force affecting the engaged threads 12 and 20, but by reference to Fig. 1 it will readily be seen that this axial force is exerted in the same direction as that exerted by the locking element 22, so that the effect is cumulative toward keeping the same set of thread flanks in constant pressure contact. As distinguished from ordinary couplings, however, constant pressure engagement between the threads is not dependent upon a pressure tight clamped relation between the engaging parts of the coupling member, the tube and the nut. If for any reason these parts should not be tightly clamped, the nut would still be secured against backing off member 10, under the influence for instance of vibration, by the action of the element 22.

I will now proceed to a description of the mode of manufacture of the above described nut, choosing as an example but without limitation the manufacture of the usual hexagonal form of nut and also calling attention to the fact that insofar as the practice of the method within the scope of the invention is concerned, the sequence of operations need not necessarily be in the same order as hereinafter described.

Having reference particularly to Figs. 3 to 7, the end of a length 34 (Fig. 3) of hexagonal bar stock, which may or may not have previously been severed from a suitable bar, is turned in an automatic screw machine or the like to provide a cylindrical outer surface 36. The length of stock to form the nut is then bored, counterbored and threaded as shown in Fig. 4, to provide a blank having the main body portion 18 with threaded bore 20, at one end of which bore is located the open recess provided by the counterbore 38. This counterbore provides a shoulder 40 between the recess and the threaded bore 20, and a second counterbore 42 provides a second shoulder 44 between the recess and the clamping extension 26 formed between the cylindrical surface 36 and the counterbore 42. The relation of the diameters of surface 36 and counterbore 42 is such that the extension 26 is in the form of a relatively thin walled cylinder. Further it is to be noted that the axial length of surface 36 is preferably such that it embraces the portion of the nut in which the recess 38 is located.

The locking element 22 is then inserted into recess 38 and clamped against axial displacement by turning the portion of the wall adjacent to shoulder 44 over the washer to form the locking flange 24, by means of any suitable broaching tool or the like, as shown at 46 in Fig. 5. As previously noted, the locking element must be restrained against turning within the nut body. This may be accomplished in a variety of ways, but from cost and ease of production standpoints is advantageously accomplished by serrating the perimeter of the recess 38 or by indenting the flange 24 at peripherally spaced intervals. In Fig. 2a a serrated recess wall 38a is shown, into which the relatively softer element 22 may readily be forced. In Fig. 5 there is shown at 48 a number of peripherally spaced projections on the working face of the tool 46 which operate to indent or dimple the flange 24 so that it bites into the element 22 as at 50. Either of these expedients may be used alone, or they may both be used.

After the locking element has been inserted and secured in place the nut blank is worked into final form by means of cold working operations which work the clamping extension 26 from its cylindrical shape to the desired shape providing the clamping surface 28. In the method herein disclosed by way of example, this is accomplished in two steps, shown in Figs. 6 and 7. In the first step, shown in Fig. 6, the partially finished nut shown in Fig. 5 is placed on a suitable anvil 52 and the cylindrical extension 26 worked to conical form as shown at 26a by means of a suitably conically recessed punch 54. In a second operation, shown in Fig. 7, the portion 26 is brought to final form by a second punch 56, recessed to desired contour and operating to force the material into contact with the face of a mandrel 58 projecting upwardly through the bore of the nut body from an anvil member 60 of which the mandrel may form a part. By this means the clamping surface 28 of predetermined contour and dimensions is obtained.

Obviously other methods of cold working may be employed, as for example, spinning of the material to desired shape instead of forming by punching operations.

From Fig. 1 it will be observed that when the coupling is assembled and drawn tight, the maximum unit stress on the material of the nut is imposed on the clamping extension 26, which is subjected to a combination of severe tension and bending stresses. However, due to the method of fabrication, the metal which is subjected to this stress has been strengthened as a result of the cold working employed to bring it to desired configuration. Consequently, a relatively light section of metal, which can readily be shaped as desired, may be used for the clamping extension and at the same time a nut of superior strength characteristics may be produced.

From the foregoing it will be apparent that in accordance with the present invention a superior form of clamping nut is provided which affords the advantages of being self-locking, strong, simple and relatively cheap and easy of manufacture by steps readily carried out by machine tools in common usage.

Obviously, many changes may be made in the specific form of the nut and in the manufacture thereof as above described, without departing from the spirit or scope of the invention, which it is intended shall include all features of product and method falling within the scope of the appended claims.

What I claim is:

1. As a new article of manufacture, a coupling nut comprising a metal body including a main body portion having a threaded bore, an annular locking element clamped in said body against axial and turning displacement at one end of said bore by metal displaced from said nut body, and a clamping extension formed by metal of the nut body extending beyond said clamping element and shaped to provide an internal clamping surface of predetermined configuration.

2. A nut as set forth in claim 1, characterized by the fact that the clamping surface is circular and converges in a direction away from said locking element.

3. A nut as set forth in claim 1 characterized by the fact that said clamping extension is in the form of a generally circular annulus of substantially uniform cross section peripherally and of axially tapering configuration to provide a substantially conical internal clamping surface.

4. A nut as set forth in claim 1 characterized by the fact that said clamping extension is formed of cold worked metal exhibiting a refined and strengthened grain structure as compared with the material of the threaded main body portion of the nut.

5. A nut as set forth in claim 1, characterized by the fact that the threaded main body portion of the nut has a non-circular external configuration for the reception of a wrench and that said clamping extension is peripherally of substantially uniform annular circular cross section.

6. As a new article of manufacture, a coupling nut comprising a main body portion having a threaded bore and providing a recess at the inner end of said bore, a locking element of elastic material fixed in said recess against axial and rotational displacement, said locking element having a bore located to be traversed and engaged by the threads of a threaded element screwed through said threaded bore, whereby to elastically grip the threads of said threaded element, and a hollow clamping portion extending axially from said main body portion and providing an internal clamping seat of predetermined configuration at least a portion of which is of less diameter than that of the bore of said locking element, whereby to permit the enlarged end portion of a hollow member to be coupled to be passed through said threaded bore and past said locking element into engagement with said internal seat and to be clamped thereagainst by the aforesaid threaded element.

7. As a new article of manufacture, a coupling nut comprising a main body portion having a threaded bore and providing a recess at the inner end of said bore, a locking element of elastic material fixed in said recess against axial and rotational displacement, said locking element having a bore located to be traversed and engaged by the threads of a threaded element screwed through said threaded bore, whereby to elastically grip the threads of said threaded element, and a hollow clamping portion extending axially from said main body portion and providing an internal clamping seat of frusto-conical configuration tapering inwardly in a direction away from said main body portion and having a portion of less diameter than that of the bore of said locking element, whereby to permit the flared end of a tubular member to be coupled to be passed through said threaded bore and past said locking element into engagement with said internal seat and to be clamped thereagainst by the aforesaid threaded element.

KLAS ARENT SWANSTROM.